United States Patent
Kuo et al.

(10) Patent No.: US 10,701,122 B2
(45) Date of Patent: Jun. 30, 2020

(54) VIDEO STREAMING STITCHING AND TRANSMITTING METHOD, VIDEO STREAMING GATEWAY AND VIDEO STREAMING VIEWER

(71) Applicant: INDUSTRIAL TECHNOLOGY RESEARCH INSTITUTE, Hsinchu (TW)

(72) Inventors: Hui-Ping Kuo, Hsinchu (TW); Yuan-Po Cheng, Taipei (TW); Guo-Ruei Chen, Yunlin County (TW)

(73) Assignee: INDUSTRIAL TECHNOLOGY RESEARCH INSTITUTE, Chutung, Hsinchu (TW)

(*) Notice: Subject to any disclaimer, the term of this patent is extended or adjusted under 35 U.S.C. 154(b) by 343 days.

(21) Appl. No.: 15/695,848

(22) Filed: Sep. 5, 2017

(65) Prior Publication Data

US 2018/0176277 A1   Jun. 21, 2018

(30) Foreign Application Priority Data

Dec. 16, 2016   (TW) .............................. 105141828 A

(51) Int. Cl.
*H04L 29/06* (2006.01)
*H04N 21/234* (2011.01)
(Continued)

(52) U.S. Cl.
CPC ........ *H04L 65/605* (2013.01); *H04L 65/1073* (2013.01); *H04L 65/4069* (2013.01);
(Continued)

(58) Field of Classification Search
CPC ............... H04L 65/605; H04L 65/1073; H04L 65/4069; H04L 65/604; H04L 65/607;
(Continued)

(56) References Cited

U.S. PATENT DOCUMENTS 7,460,730 B2   12/2008  Pal et al.
8,332,889 B2   12/2012  Calzone
(Continued)

FOREIGN PATENT DOCUMENTS

CN   101841695 A   9/2010
CN   102256111 A   11/2011
(Continued)

OTHER PUBLICATIONS

Yu-jing Zhao, "Video image stitching based on moving object detection and motion prediction compensation", Image and Signal Processing, 2010 3rd International Congress, Oct. 16, 2010, 6 pages.
(Continued)

*Primary Examiner* — Zi Ye
(74) *Attorney, Agent, or Firm* — Muncy, Geissler, Olds & Lowe, P.C.

(57) ABSTRACT

A video streaming stitching and transmitting method, a video streaming gateway and a video streaming viewer are provided. The video streaming stitching and transmitting method includes the following steps: A plurality of video frames and a plurality of geo-topology data are provided. A registration data corresponding to a first time point is generated according to part of the video frames and part of the geo-topology data corresponding to the first time point, and the registration data is temporarily stored. Part of the video frames corresponding to a second time point is stitched as a stitched video frame according to the registration data corresponding to the first time point. The second time point is different from the first time point.

24 Claims, 10 Drawing Sheets

(51) Int. Cl.
*H04N 21/258* (2011.01)
*H04N 21/235* (2011.01)
*H04N 21/84* (2011.01)
*H04N 21/422* (2011.01)
*H04N 21/2665* (2011.01)

(52) U.S. Cl.
CPC .......... *H04L 65/604* (2013.01); *H04L 65/607* (2013.01); *H04N 21/234* (2013.01); *H04N 21/235* (2013.01); *H04N 21/25841* (2013.01); *H04N 21/2665* (2013.01); *H04N 21/42202* (2013.01); *H04N 21/84* (2013.01); *H04L 65/103* (2013.01)

(58) Field of Classification Search
CPC .. H04L 65/103; H04N 21/234; H04N 21/235; H04N 21/25841; H04N 21/2665; H04N 21/42202; H04N 21/84
USPC ........................................................ 709/219
See application file for complete search history.

(56) References Cited

U.S. PATENT DOCUMENTS

| | | | |
|---|---|---|---|
| 8,863,182 | B1 | 10/2014 | Sharifi et al. |
| 9,355,433 | B1 * | 5/2016 | Adsumilli ............. G06T 3/4038 |
| 2009/0040293 | A1 | 2/2009 | Foo et al. |
| 2010/0171834 | A1 * | 7/2010 | Blumenfeld ....... H04N 5/23203 |
| | | | 348/159 |
| 2010/0251101 | A1 | 9/2010 | Haussecker et al. |
| 2014/0098185 | A1 | 4/2014 | Davari et al. |
| 2015/0054913 | A1 | 2/2015 | Annau et al. |
| 2015/0116451 | A1 | 4/2015 | Xu et al. |
| 2016/0028950 | A1 | 1/2016 | Perazzi et al. |
| 2016/0142643 | A1 * | 5/2016 | Jiang ....................... G06T 5/006 |
| | | | 348/598 |

FOREIGN PATENT DOCUMENTS

| | | |
|---|---|---|
| CN | 103793891 A | 5/2014 |
| CN | 105306837 A | 2/2016 |
| TW | I390966 B | 3/2003 |
| TW | I298852 B | 7/2008 |
| TW | I543611 B | 7/2016 |
| TW | I571806 B | 2/2017 |
| WO | WO2016/048014 A1 | 3/2016 |
| WO | WO-2016048014 A1 * | 3/2016 ........... H04N 13/524 |

OTHER PUBLICATIONS

R. Kumar, "Registration of video to geo-referenced imagery", Pattern Recognition, 1998, 14$^{th}$ International Conference Proceedings, Aug. 20, 1998, 10 pages.

Motaz El-Saban et al.; "Stitching Videos Streamed by Mobile Phones in Real Time"; MM'09, Oct. 19-24, 2009; pp. 1009-1010; Beijing, China.

Xiangyun Meng et al.; "SkyStitch: a Cooperative Multi-UAV-based Real-time Video Surveillance System with Stitching"; MM'15, Oct. 26-30, 2015; pp. 261-270; Brisbane, Australia.

Wei Jiang et al.; "Video Stitching with Spatial-Temporal Content-Preserving Warping"; CVPR 2015 Workshop-Computer Vision Foundation; 2015; pp. 42-48.

Fan Zhang et al.; "Casual Stereoscopic Panorama Stitching", 2015 IEEE Conference on Computer Vision and Pattern Recognition (CVPR); 2015; pp. 2002-2010; 978-1-4673-6964-0/15.

Motaz El-Saban et al.; "Improved Optimal Seam Selection Blending for Fast Video Stitching of Videos Captured From Freely Moving Devices"; 2011 18$^{th}$ IEEE International Conference on Image Processing; 2011; pp. 1481-1484.

Jason De Villiers; "Real-time photogrammertric stitching of high resolution video on COTS hardware"; 2009 International Symposium on Optomechatronic Technologies; 2009; pp. 46-51; 978-4244-4210-2-09.

Espen Oldeide Helgedagsrud; "Efficient implementation and processing of a real-time panorama video pepeline with emphasis on dynamic stitching"; Master's thesis; Apr. 2013; pp. 1-101; Oslo.

Qianfei Zhou et al.; "Automatic orthorectification and mosaicking of oblique images from a zoom lens aerial camera"; Optical Engineering.SPEIDigitalLibrary.org; Jan. 2015; pp. 013104-1-013104-14; vol. 54(1).

Zheng Yang et al.; "Understanding Node Localizability of Wireless Ad Hoc and Sensor Networks"; IEEE Transactions on Mobile Computing, Aug. 2012; pp. 1249-1260; vol. 11, No. 9.

* cited by examiner

VIDEO STREAMING STITCHING AND TRANSMITTING METHOD, VIDEO STREAMING GATEWAY AND VIDEO STREAMING VIEWER

CROSS-REFERENCE TO RELATED APPLICATION

This application claims the benefit of Taiwan application Serial No. 105141828, filed Dec. 16, 2016, the subject matter of which is incorporated herein by reference.

TECHNICAL FIELD

The disclosure relates in general to a video streaming stitching and transmitting method, a video streaming gateway and a video streaming viewer.

BACKGROUND

Real-time video streaming has been widely used in the fields such as real-time monitoring and intelligent transportation to provide real-time information for command and judgment. In recent years, lots of unmanned aerial vehicle (UAV) application are proposed. For example, the live streaming or image captured using UAV plays an important role in the fields of application such as geomorphological observation, pollution monitoring, and disaster scenes. Real-time video can help the user to make a judgment at the first time, to correct of flight route, or to modify the direction of the camera. Therefore, real-time video streaming is expected to play an essential role in the fields of application exemplified above.

However, existing video streaming sources (such as surveillance camera, mobile phones, or sport video recorders) all have their restrictions in the field of view (FOV). If the target monitoring area could not be covered by the FOV of one single camera, multiple cameras or UAVs will be applied at the same time t. Since each camera is set at different location with different angle, how to monitor all camera at the same time is very difficult. With the video stitching technology, the vision of all camera can be aggregated as one single video streaming, greatly simplifying the operation of monitoring. Since the contents of multiple video sources can be viewed through one single image, the efficiency of monitoring can be greatly increased and a large amount of labor can be saved.

Video stitching requires heavy computation power. The more the video sources, the larger the amount of computation is required. When a large number of cameras or UAVs are used, the huge computation time leads to a serious video delay.

SUMMARY

The disclosure is related to a video streaming stitching and transmitting method, the video streaming gateway and the video streaming viewer.

According to one embodiment of the disclosure, a video streaming stitching and transmitting method are provided. The video streaming stitching and transmitting method includes the following steps: A plurality of video frames and a plurality of geo-topology data are provided. A registration data corresponding to a first time point is generated according to part of the video frames and part of the geo-topology data corresponding to the first time point, and the registration data is temporarily stored. Part of the video frames corresponding to a second time point is stitched as a stitched video frame according to the registration data corresponding to the first time point. The second time point is different from the first time point.

According to another embodiment of the disclosure, a video streaming gateway is provided. The video streaming gateway includes a video streaming receiving unit, a geo-topology data receiving unit, a video stitching feature processing unit, a registration data cache unit, a registration data sending unit, and a video streaming sending unit. The video streaming receiving unit is used for receiving a plurality of video frames. The geo-topology data receiving unit is used for receiving a plurality of geo-topology data. The video stitching feature processing unit is used for obtaining a registration data corresponding to a first time point according to part of the video frames and part of the geo-topology data corresponding to the first time point. The registration data cache unit is used for temporarily storing the registration data. The registration data sending unit is used for sending the registration data. The video streaming sending unit is used for sending the video frames to a video streaming viewer, and the video streaming viewer can stitch part of the video frames as a stitched video frame corresponding to a second time point according to the registration data corresponding to the first time point. The second time point is different from the first time point.

According to an alternate embodiment of the disclosure, a video streaming viewer is provided. The video streaming viewer includes a video streaming receiving unit, a registration data receiving unit and a video stitching unit. The video streaming receiving unit is used for receiving a plurality of video frames. The registration data receiving unit is used for receiving a registration data corresponding to a first time point. The video stitching unit is used for stitching part of the video frames corresponding to a second time point as a stitched video frame according to the registration data corresponding to the first time point. The second time point is different from the first time point.

The above and other aspects of the invention will become better understood with regard to the following detailed description of the preferred but non-limiting embodiment(s). The following description is made with reference to the accompanying drawings.

DETAILED DESCRIPTION

Figure 1:
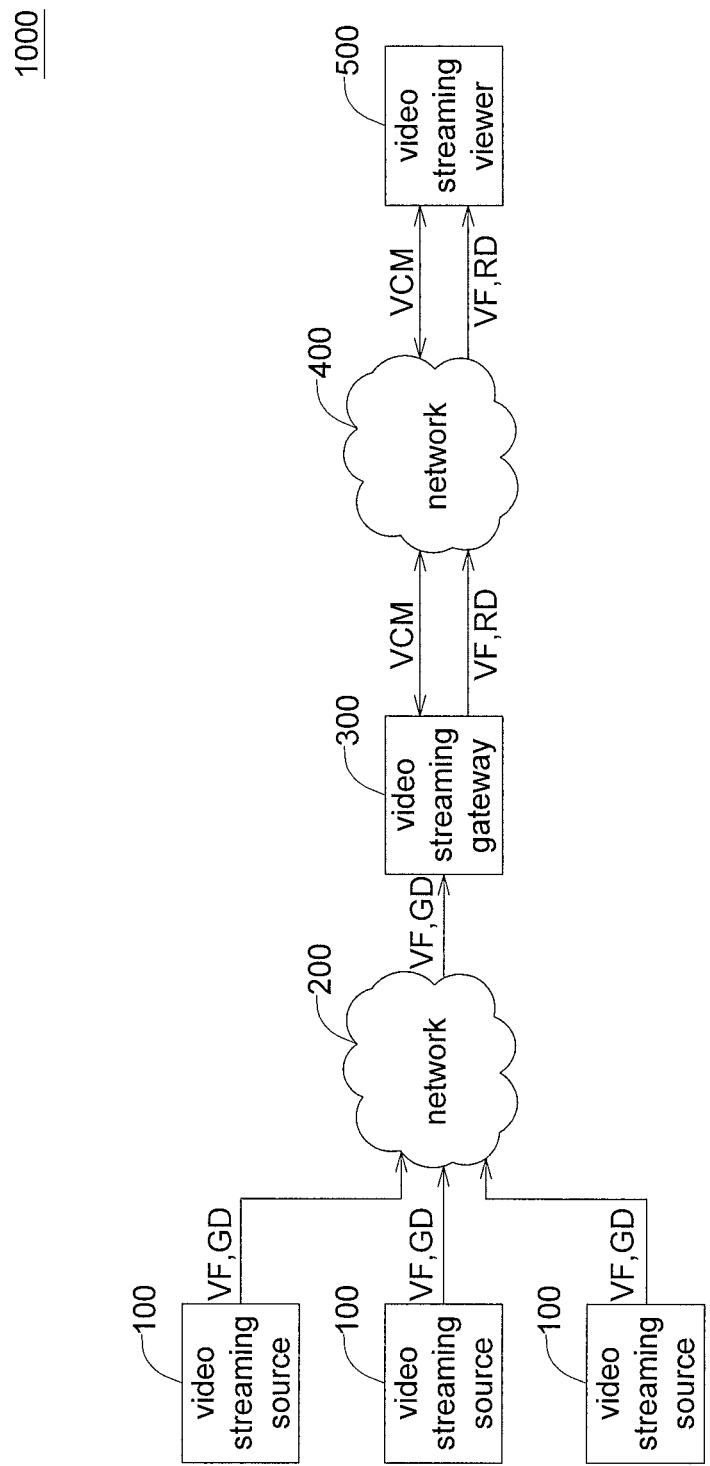
FIG. 1 is a schematic diagram of a video streaming real-time stitching and sending system according to an embodiment.

Referring to FIG. 1, a schematic diagram of a video streaming stitching and sending system 1000 according to an embodiment is shown. The video streaming stitching and sending system 1000 includes a plurality of video streaming sources 100, a video streaming gateway 300 and a video streaming viewer 500. The video streaming source 100 is a mobile device having shooting video function and is capable of encoding and transmitting video streaming. The video streaming source 100 can be realized by such as an unmanned aerial vehicle (UAV). The video streaming can be realized by such as encoded H.264 video streaming transmitted according to the real-time streaming protocol (RTSP) or the real-time transport protocol (RTP).

The video streaming gateway 300 has video streaming processing and transmitting function, and can be realized by such as a chip, a computer, a circuit board, a server or a router. The video streaming viewer 500 includes a man-machine interface, and has video streaming receiving and processing function, and can be realized by such as a computer, a smart phone, a PC tablet.

Multitudes of video streaming sources 100 can be connected to the video streaming gateway 300 through a proximal network 200 having shorter delay and wider band. The network 200 can be realized by such as a cabled medium having shorter delay and wider band or a wireless medium such as WiFi or local area network (LAN). Each video streaming source 100 can obtain a video frame VF by using such as video recorder, camera, infrared video recorder or thermal sensing camera and further transmit the obtained video frame VF to the video streaming gateway 300 through the network 200. The network 200 having shorter delay and wider band can provide fast data exchange between each video streaming source 100 and the video streaming gateway 300.

Apart from the real-time video shooting function, the video compressing function and the transmitting function, each video streaming source 100 has the function of detecting its geo-topology data GD. The video streaming sources 100 can obtain the absolute longitude, latitude, height or even the moving speed by using a sensor, such as a global positioning system (GPS). The video streaming sources 100 can also detect acceleration or vibration by using an acceleration sensor. The video streaming sources 100 can also detect the angle of pan, tilt and roll of the camera by using a gyroscope or an electronic compass. The above information and their collection time are collected in the geo-topology data GD, and then are sent to the video streaming gateway 300 through the network 200.

The video streaming gateway 300 can obtain a registration data RD according to the video frame VF and the geo-topology data GD.

The video streaming gateway 300 is connected to the video streaming viewer 500 through a network 400. The network 400 is a wide-area transmission medium having restricted bandwidth and longer transmission delay compared to the network 200. The network 400 can be composed of one or more than one physical medium such as asymmetric digital subscriber line (ADSL), fiber, Wi-Fi, general packet radio service (GPRS), and 3G or 4G LTE network.

The video streaming viewer 500 receives the video frames VF and the registration data RD from the video streaming gateway 300, stitches the video frames VF according to the registration data RD, and then displays the stitched video frame for the user to view and operate.

Figure 2A:
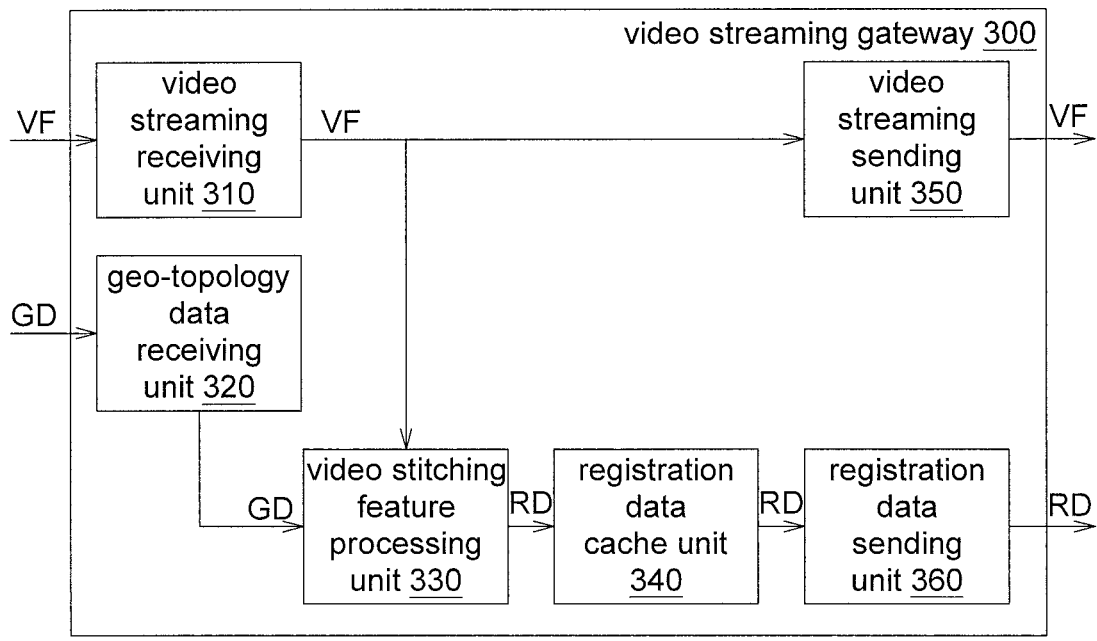
FIG. 2A is a schematic diagram of a video streaming gateway according to an embodiment.

Referring to FIG. 2A, a schematic diagram of a video streaming gateway 300 according to an embodiment is shown. The video streaming gateway 300 includes a video streaming receiving unit 310, a geo-topology data receiving unit 320, a video stitching feature processing unit 330, a registration data cache unit 340, a video streaming sending unit 350 and a registration data sending unit 360. The video streaming receiving unit 310 is used for receiving the video frames VF. The geo-topology data receiving unit 320 is used for receiving the geo-topology data GD. The video streaming receiving unit 310 and the geo-topology data receiving unit 320 can be realized by such as such as a wireless network module, a network line, a signal line, an antenna, a radio frequency chip, an accompanying software program, or a combination thereof. The video stitching feature processing unit 330 is used for generating the registration data RD. The video stitching feature processing unit 330 can be realized by such as a chip, a circuit, a circuit board, a temporary storage device temporarily storing a plurality of programming codes, or a programming code which can be executed by a processor. The processor (not illustrated) can be installed in the video streaming gateway 300. The registration data cache unit 340 is used for temporarily storing the registration data RD, and can be realized by such as a memory, a hard disc, a solid state disc, a flash memory or a cloud temporary storage center. The video streaming sending unit 350 is used for sending the video frames VF. The registration data sending unit 360 is used for sending the registration data RD. The video streaming sending unit 350 and the registration data sending unit 360 can be realized by such as a wireless network module, a network line, a signal line, an antenna, a radio frequency chip, an accompanying software program, or a combination thereof.

Figure 2B:
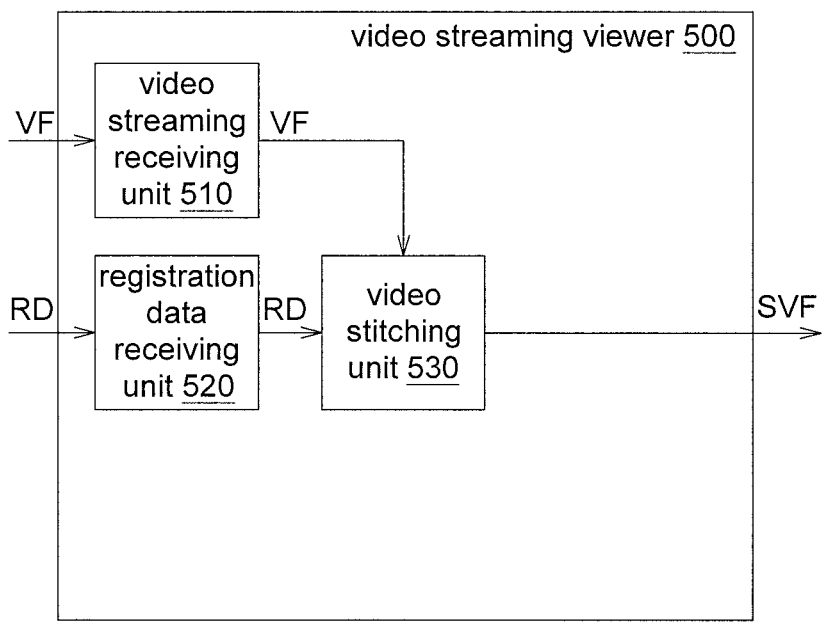
FIG. 2B is a schematic diagram of a video streaming viewer according to an embodiment.

Referring to FIG. 2B, a schematic diagram of a video streaming viewer 500 according to an embodiment is shown. The video streaming viewer 500 includes a video streaming receiving unit 510, a registration data receiving unit 520 and a video stitching unit 530. The video streaming receiving unit 510 is used for receiving the video frames VF. The registration data receiving unit 520 is used for receiving the registration data RD. The video streaming receiving unit 510 and the registration data receiving unit 520 can be realized by such as a wireless network module, a network line, a signal line, an antenna, a radio frequency chip or a combination thereof. The video stitching unit 530 is used for performing video stitching, and can be realized by such as a chip, a circuit, a circuit board, temporary storage device temporarily storing a plurality of programming codes, or an accompanying software program.

Figure 3:
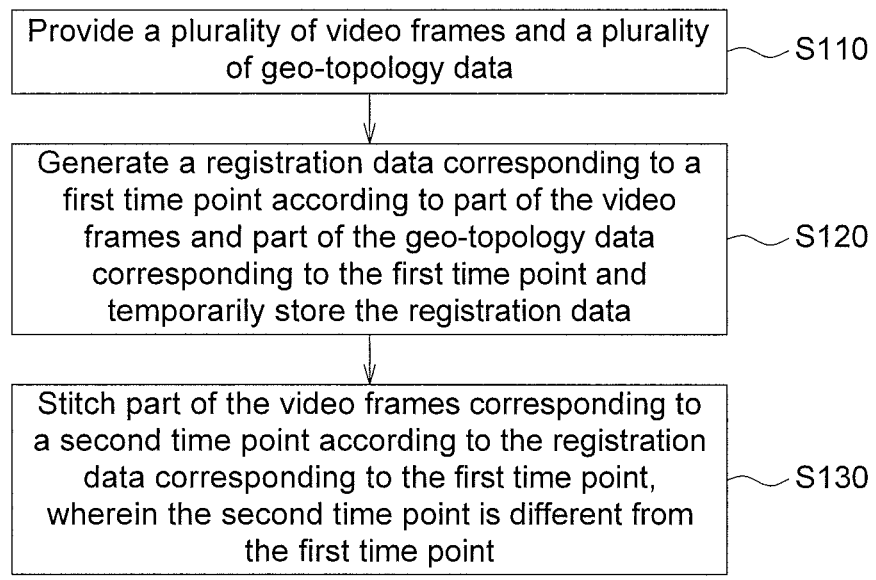
FIG. 3 is a flowchart of a video streaming stitching and transmitting method according to an embodiment.
Figure 4:
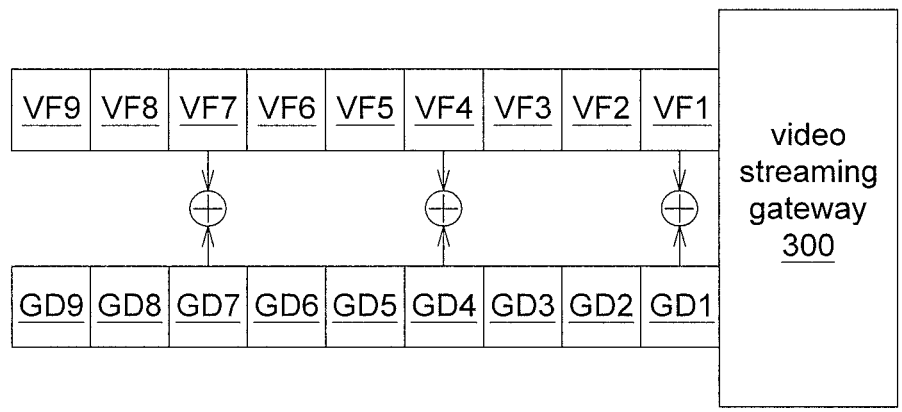
FIG. 4 is a data timing diagram of FIG. 3.
Figure 4:
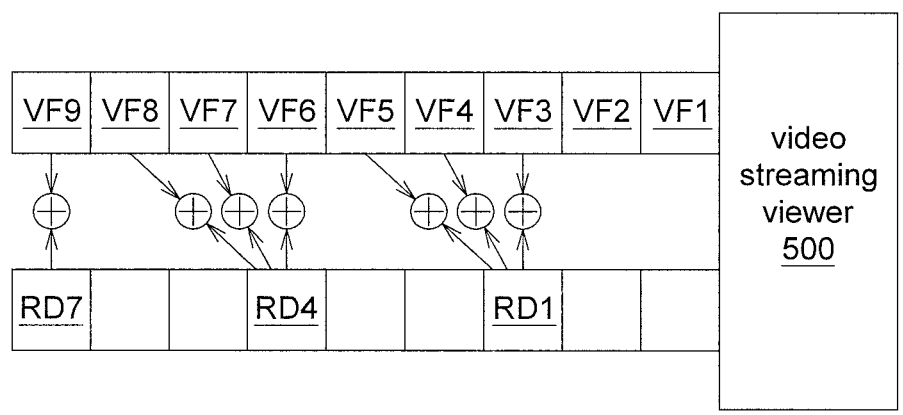

Referring to FIGS. 3 to 4. FIG. 3 is a flowchart of a video streaming stitching and transmitting method according to an embodiment. FIG. 4 is a data timing diagram of FIG. 3. The flowcharts are described below with the description of each element of FIGS. 1 to 2B. However, the implementation of FIG. 3 is not limited to the video streaming gateway 300 of FIG. 2A and the video streaming viewer 500 of FIG. 2B.

Firstly, the method begins at step S110, a plurality of video frames and a plurality of geo-topology data are provided by a plurality of video streaming sources 100. In an embodiment, the video streaming sources 100 provide a plurality of video frames VF1 to VF9 (illustrated in FIG. 4) and a plurality of geo-topology data GD1 to GD9 (illustrated in FIG. 4) in an order of time points T1 to T9 (illustrated in FIG. 4). The video frames VF1 to VF9 are sent to the video streaming receiving unit 310 of the video streaming gateway 300, and the geo-topology data GD1 to GD9 are sent to the geo-topology data receiving unit 320 of the video streaming gateway 300. In an embodiment, the video frame VF1 includes frames provided by the video streaming sources 100 at the time point T1, and therefore the frames in the video frame VF1 can be plural. The geo-topology data GD1 includes geography data provided by the video streaming sources 100 at the time point T1, and therefore the geography data in the geo-topology data GD1 can be plural. Similarly, the frames in each of the video frames VF2 to VF9 and/or the geography data in each of the geo-topology data GD2 to GD9 can be plural.

Next, in step S120, a registration data corresponding to a first time point is obtained by the video streaming gateway 300 according to part of the video frames and part of the geo-topology data corresponding to the first time point, and the registration data is temporarily stored. In an embodiment, the video stitching feature processing unit 330 of the video streaming gateway 300 generates the registration data RD1 corresponding to the time point T1 according to the video frame VF1 corresponding to the time point T1 and the geo-topology data GD1 corresponding to the time point T1, and the registration data RD1 is temporarily stored in the registration data cache unit 340 of the video streaming gateway 300. The process of generating the registration data RD1 requires a longer processing time, so the registration data RD1 can be generated later, but the video frames VF1 to VF9 are sent to the video streaming gateway 300 and the video streaming viewer 500 in real time without waiting the registration data RD1 to be finished processing. For example, the registration data RD1 is completely generated and sent to the video streaming viewer 500 at time point T3. Therefore, the video streaming viewer 500 receives the video frames VF1 to VF3 and the registration data RD1 until the time point T3.

Then, in step S130, part of the video frames corresponding to the second time point are stitched by the video streaming viewer 500 according to the registration data corresponding to the first time point, wherein the second time point is different from the first time point. In an embodiment, the video stitching unit 530 of the video streaming viewer 500 stitches the video frame VF3 corresponding to the time point T3 according to the registration data RD1 corresponding to time point T1. That is, the video streaming viewer 500, after receiving the video frame VF3 at time point T3, immediately performs the stitching process according to the generated registration data RD1 instead of waiting the registration data RD3 (not illustrated) corresponding to time point T3 to be received. The step of stitching the video frame VF3 corresponding to the time point T3 according to the registration data RD1 is to obtain a larger video frame formed by stitching the frames provided by the video streaming sources 100 corresponding to the time point T3 according to the information of the registration data RD1. For example, the information of the registration data RD1 is for stitching some points or pixels of the video frames provided by one of the video streaming sources 100 with projection (projection here means selectively rotated or transposed to an angle or zoomed) with some points or pixels of the video frames provided by another video streaming source 100 with projection (projection here means selectively rotated or transposed to an angle or zoomed).

Moreover, the registration data RD1 can be used repetitively. Before the next registration data, that is, registration data RD4, is generated, the video stitching unit 530 stitches the video frame VF4 corresponding to time point T4 and stitches the video frame VF5 corresponding to time point T5 according to the registration data RD1 corresponding to the time point T1. The step of stitching the video frame VF4 corresponding to the time point T4 is to obtain a larger video frame formed by stitching the frames provided by the video streaming sources 100 corresponding to the time point T4. The video frames corresponding to each of other time points can be obtained by the same analogy.

When the registration data RD4 corresponding to the time point T4 is generated at time point T6, the video stitching unit 530 stitches the video frame VF6 corresponding to the time point T6, stitches the video frame VF7 corresponding to time point T7, and stitches the video frame VF8 corresponding to time point T8 according to the registration data RD4 corresponding to the time point T4. Likewise, when the registration data RD7 corresponding to time point T7 is generated at time point T9, the video stitching unit 530 stitches the video frame VF9 corresponding to time point T9 according to the registration data RD7 corresponding to the time point T7.

That is, the video streaming gateway 300 and the video streaming viewer 500 use pipeline technology to simultaneously perform the process of generating the registration data RD and the process of stitching the video frame VF. Moreover, when the video streaming gateway 300 and the video streaming viewer 500 stitch the video frame VF, the registration data RD corresponding to previous time points are used, so the delay caused by the generation of the registration data RD can be reduced. The stitching and transmission of video streaming is only delayed by the process of stitching video frame VF, so the delay can be greatly reduced. An experimental result shows that in comparison to a conventional transmission method in which the video streaming is transmitted only after the stitching of whole of the video frames is completed, the transmission method of the present disclosure reduces the delay in the stitching and transmission of video streaming to 0.2 seconds form 2.5 seconds to achieve real time.

Figure 5:
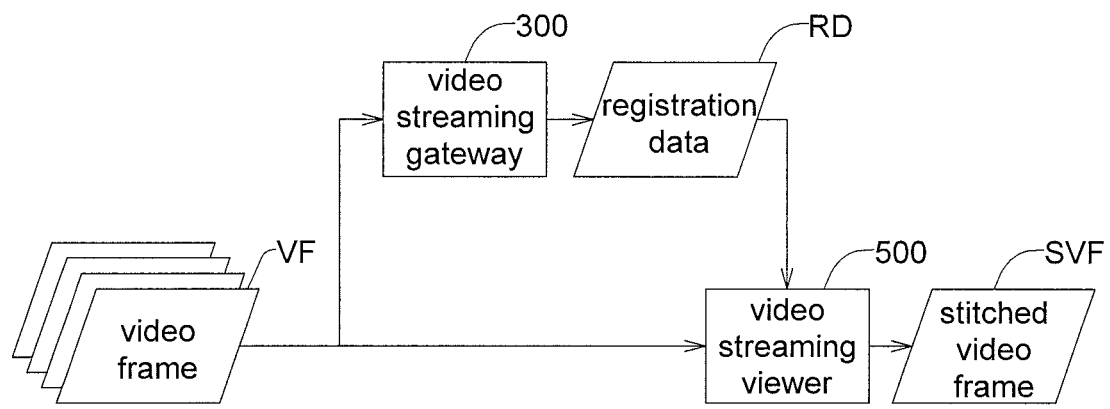
FIG. 5 is a schematic diagram of the transmission of video frames.

Referring to FIG. 5, a schematic diagram of the transmission of video frame VF is shown. In the present embodiment, for the process of generating the registration data RD and the process of stitching the video frame VF to be performed simultaneously, the video frame VF is simultaneously sent to the video streaming gateway 300 and the video streaming viewer 500. The video streaming viewer 500, after receiving the registration data RD, immediately stitches the video frame VF according to the received registration data RD to generate a stitched video frame SVF. In an embodiment, the video frame VF can be transferred to the video streaming viewer 500 through the video streaming gateway 300. Or, in another embodiment, the video frame VF can be directly sent to the video streaming viewer 500.

Refer to FIG. 5. Since the video streaming viewer 500 may only need to display a partial area of the frame, the video streaming viewer 500 can merely send the needed part of the video frame VF to the video streaming viewer 500. The registration data RD is with smaller amount of data, can be completely transmitted to the video streaming viewer 500 without burdening the network 400. Thus, in comparison to the method in which stitching is performed after whole of the video frames of each video source are sent to the viewer, the method of the present disclosure can effectively reduce competition in bandwidth during the transmission of video frames.

Figure 6:
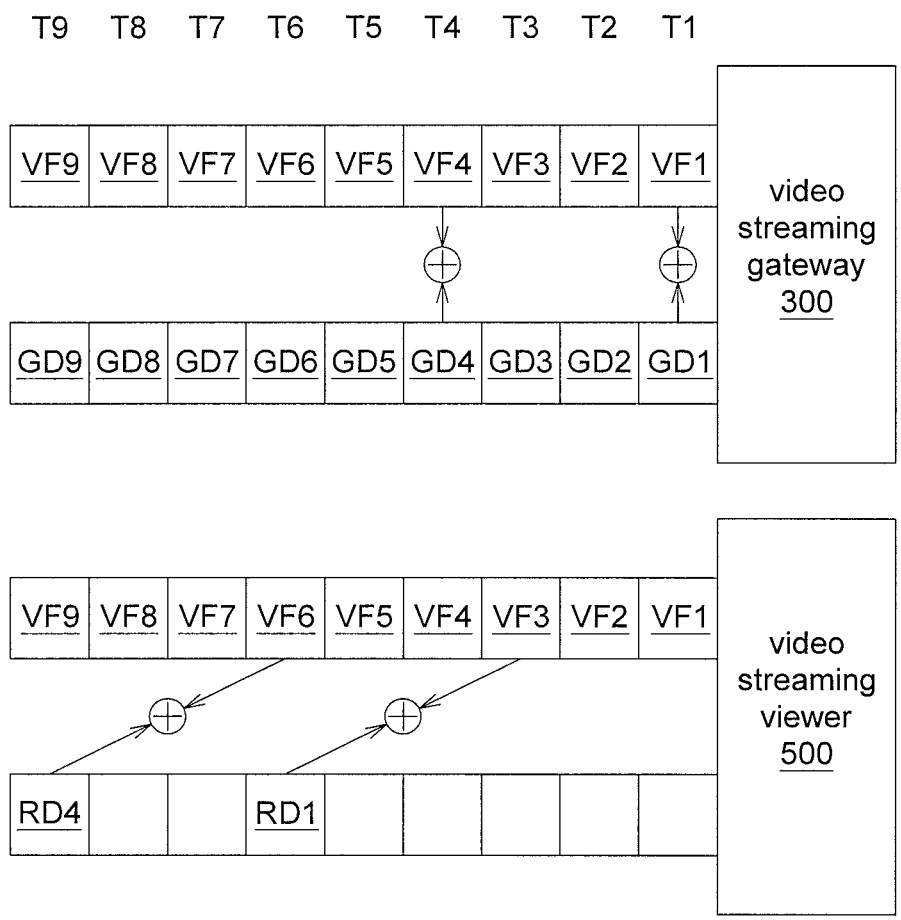
FIG. 6 is a data timing diagram according to another embodiment.

Referring to FIG. 6, a data timing diagram according to another embodiment is shown. In above process of stitching the video frame VF, the video frame VF and the registration data RD correspond to different time points. To ensure the stitch frame quality, an registration data error of the stitched video frame SVF needs to be under a predetermined level. The registration data error corresponds to time window threshold. During the process of stitching the video frame VF, by controlling the time difference between the time point of the video frame VF and the time point of the registration data RD to be within the time window threshold, the frame quality will be satisfied. Let FIG. 6 be taken for example. The error time is 2 time units. If the video streaming viewer 500 cannot obtain the registration data RD1 corresponding to time point T1 until time point T6 due to factors such as network congestion or computational latency, the video streaming viewer 500 can stitch the temporarily cached video frame VF3 corresponding to time point T3 according to the registration data RD1 corresponding to time point T1 to avoid the time difference between the two time points exceeding the said time window threshold (here in the example is 2 time units), such that the frame quality can be kept at a certain level. Likewise, if the video streaming viewer 500 cannot obtain the registration data RD4 corresponding to time point T4 until time point T9, the video streaming viewer 500 can stitch the temporarily cached video frame VF6 corresponding to time point T6 according to the registration data RD4 corresponding to time point T4 to avoid the time difference between the two time points exceeding the said time window threshold (here in the example is 2 time units), such that the frame quality can be kept at a certain level.

The above accuracy can be predicted according to the overlapping degree of the video frames VF, the geographical location of the video streaming sources 100, the motion status of the video streaming sources 100, or the changing degree of the video frame VF to estimate the tolerable time window threshold.

Figure 7A:
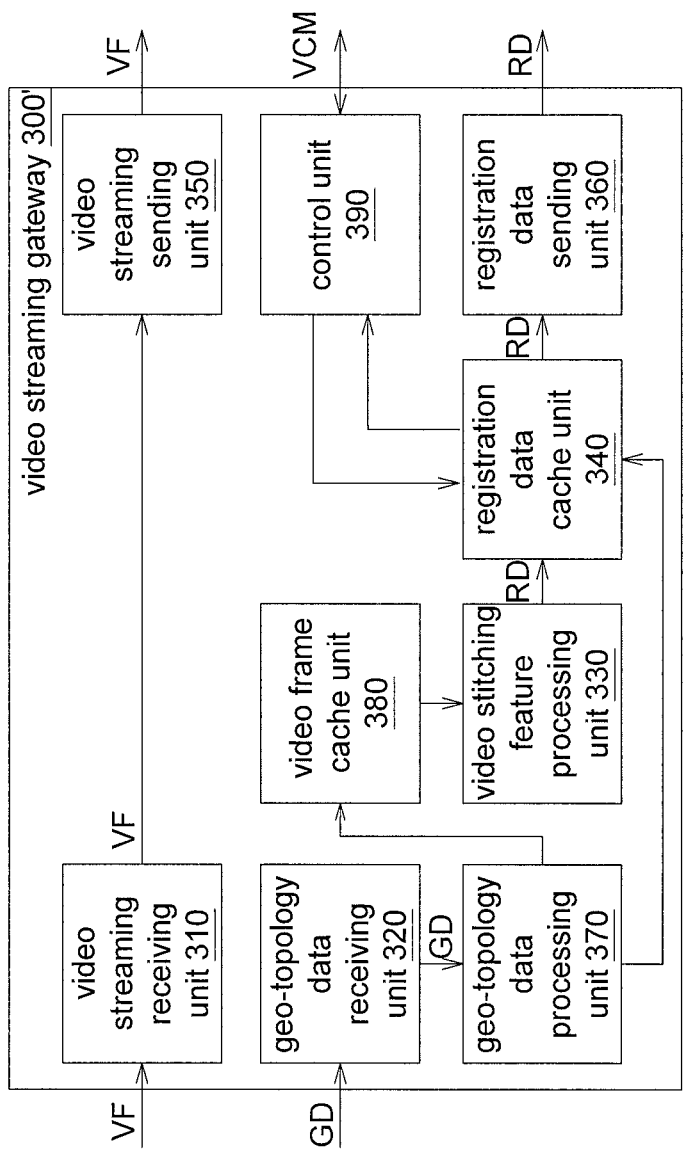
FIG. 7A is a schematic diagram of a video streaming gateway according to another embodiment.

Referring to FIG. 7A, a schematic diagram of a video streaming gateway 300' according to another embodiment is shown. In comparison to the video streaming gateway 300 of FIG. 2A, the video streaming gateway 300' of FIG. 7A further includes a geo-topology data processing unit 370, a video frame cache unit 380 and a control unit 390. The geo-topology data processing unit 370 is used for processing the geo-topology data GD. The control unit 390 is used for performing various control procedures. The geo-topology data processing unit 370 and the control unit 390 can be realized by such as a chip, a circuit, a circuit board, a temporary storage device temporarily storing a plurality of programming codes or a programming code performed by the processor. The video frame cache unit 380 is used for storing the video frames VF, and can be realized by such as a memory, a hard disc, a solid state disc, a flash memory, or a cloud temporary storage center.

The video frames VF can be transferred to the video streaming viewer 500' through the video streaming sending unit 350 or temporarily stored in the video frame cache unit 380. The video frame cache unit 380, according to its available space and the expected size of video frames after encoding, reserves most recent T seconds or M frames of the video frames VF for each video streaming source 100. The data stored in the video frame cache unit 380 includes the complete data of each video frame VF, the identification code of the video streaming source 100 to which each video frame VF belongs, and timing synchronous control information related to each video frame VF (including but not limited to the serial number, relative time stamp, and absolute time of the frame, and/or the frame rate).

The geo-topology data GD and its time information will be sent to the geo-topology data processing unit 370. The geo-topology data processing unit 370, according to the geo-topology data GD of each video streaming source 100, analyzes the position and motion state of each video streaming source 100, and continuously calculates the change in relative position between the video streaming sources 100. The GPS coordinates, camera orientation, and lens viewing angle of the geo-topology data GD can be used for calculating the relative distance between the video streaming sources 100 and the change in the shooting coverage through ortho-rectification and distance to the ground surface.

The change in relative position obtained by the geo-topology data processing unit 370 is used by the video frame cache unit 380 as a criterion for selecting video frame VF. In some embodiments, the video frame cache unit 380 can select and send less than N frames (N<M) of the video frame VF to the video stitching feature processing unit 330 for subsequent calculation. In some other embodiments, the video frame cache unit 380 can select and send less than S seconds (S<T) of the video frame VF to the video stitching feature processing unit 330 for subsequent calculation.

If the change in relative position between the video streaming sources 100 is large, then the video frame cache unit 380 will select a smaller N or S. If no video frame VF is received from any video streaming source 100, then video frames VF recently received by the video streaming receiving unit 310 will be provided to the video stitching feature processing unit 330 for subsequent calculation. If the change in relative position between video streaming sources 100 is small, then a larger N or S will be selected, and a set of video frames VF temporarily stored in the video frame cache unit 380 will be used for subsequent calculation.

The video stitching feature processing unit 330 obtains a registration data RD containing the description of relative position and overlapping area between the video frames VF. The registration data RD are temporarily stored in the registration data cache unit 340, and provided to the registration data sending unit 360, which will transfer the received registration data to the video streaming viewer 500'.

The registration data cache unit 340 concurrently records the serial number, relative time stamp or absolute time of the video frame VF currently referred by each set of registration data RD, predicts an expiry time corresponding to the set of registration data RD according to the change in relative position obtained by the geo-topology data processing unit 370, and records the predicted expiry time in the registration data cache unit 340. In some other embodiments, the expiry time recorded in the registration data cache unit 340 can be the serial number, absolute time, or relative time stamp of the frame.

In some other embodiments, when the registration data cache unit 340 finds that the temporarily stored registration data RD has expired, the registration data cache unit 340 can delete the expired registration data RD. In some other embodiments, when the geo-topology data processing unit 370 finds that the relative position changes significantly or exceeds a threshold, the geo-topology data processing unit 370 proactively sends a command to request the registration data cache unit 340 to clear the temporarily stored registration data RD until the change in relative position stabilizes.

The geo-topology data processing unit 370 continues with the analysis. When the geo-topology data processing unit 370 finds that the relative position between multitudes of video streaming sources 100 is in a stable state, the video stitching feature processing unit 330 can perform feature point search using older video frames VF temporarily stored in the video frame cache unit 380, and within a valid time frame, the video stitching feature processing unit 330 can repetitively use the registration data RD stored in the registration data cache unit 340. Due to the high degree of similarity between subsequent images, even when the registration data RD of previous frame is used in the process of stitching video streaming, the error of feature point offset still can be negligible if the change in relative position is insignificant. Based on this feature, the expiry time of the repetitive use of the registration data RD can be estimated, such that the influence of calculation delay on the realtimeliness of video streaming can be reduced.

In an embodiment, the calculation of the video stitching feature processing unit 330 can be performed at a fixed time interval. In another embodiment, the time interval of calculation can be adjusted according to the change in relative position, and the data update interval of the registration data cache unit 340 can be adjusted accordingly to meet the state of the change in relative position.

The control unit 390 can receive a viewing control message VCM from the network 400. The viewing control message VCM includes the commands related to the realtime streaming application for viewing stitched video on the video streaming viewer 500'. The viewing control message VCM includes but is not limited to moving the position or changing the direction of the viewing area, and zooming the viewing area. In some embodiments, the viewing control message VCM may include the command which controls the movement method of the video streaming sources 100.

When the control unit 390 receives a control message for changing the viewing area, the control unit 390 will find out the video streaming source 100 containing the said area according to the registration data RD temporarily stored in the registration data cache unit 340 and return a message to the streaming viewer. In some embodiments, the return message may include an identification code related to the video streaming source 100. In another embodiment, the return message may include a video streaming connection resource, such as the URL of RTSP, related to the video streaming source 100. In another embodiment, if one of the video streaming sources 100 is not sending the video frame VF, the control unit 390 needs to send a command to request the video streaming sending unit 350 to establish a connection resource. With the said design, the implementation of the present disclosure of streaming the video data of partial area only request demand can be achieved.

In some embodiments, the video streaming viewer 500' can send a specific control message when the movement state of the video streaming source 100 changes. When the control unit 390 receives this control message, the control unit 390 can request the registration data cache unit 340 to invalidate and clear the temporarily stored registration data RD.

Figure 7B:
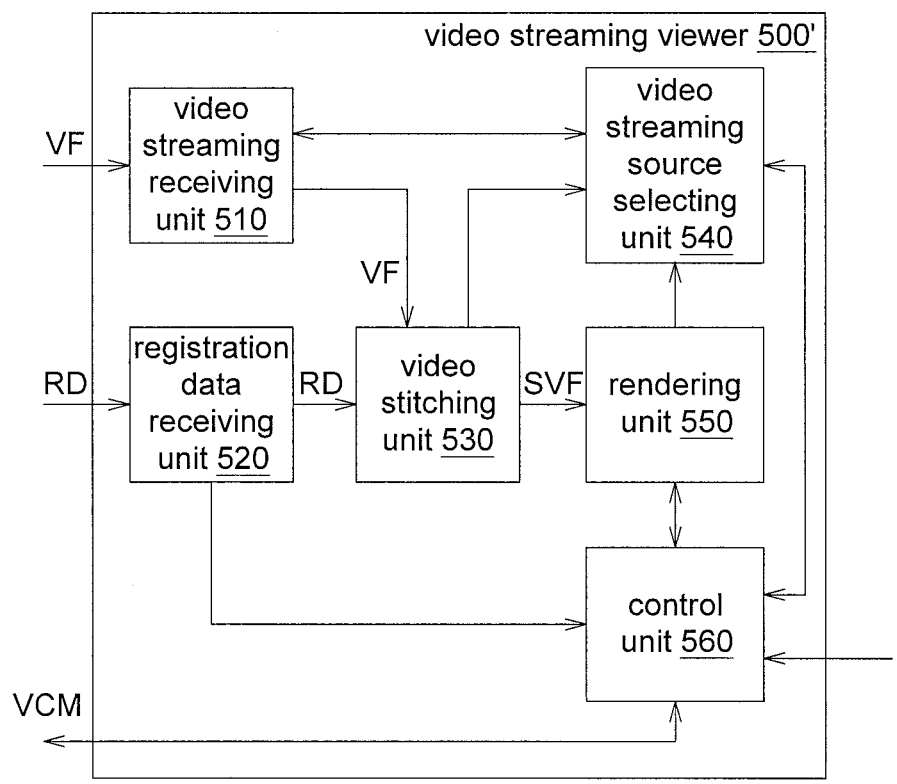
FIG. 7B is a schematic diagram of a video streaming viewer according to another embodiment.

Referring to FIG. 7B, a schematic diagram of a video streaming viewer 500' according to another embodiment is shown. In comparison to the video streaming viewer 500 of FIG. 2B, the video streaming viewer 500' of FIG. 7B further includes a video streaming source selecting unit 540, a rendering unit 550 and a control unit 560. The video streaming source selecting unit 540 is used for selecting some specific video streaming sources 100. The rendering unit 550 is used for performing a redrawing procedure. The control unit 560 is used for performing various control procedures. The video streaming source selecting unit 540, the rendering unit 550 and the control unit 560 can be realized by such as a chip, a circuit, a circuit board, or temporary storage device temporarily storing a plurality of programming codes.

The video streaming receiving unit 510 can concurrently receive multiple sets of video frames VF from different video streaming sources 100 via the video streaming gateway 300'. The received video frames VF will be temporarily stored in a small queue of the video streaming receiving unit 510. Meanwhile, the registration data receiving unit 520 receives a registration data RD from the video streaming gateway 300'.

The video stitching unit 530 will obtain the registration data RD received by the registration data receiving unit 520. The video stitching unit 530 will obtain the video frame VF of each video streaming source 100 meeting the time limit from the video streaming receiving unit 510 according to the expiry time of the registration data RD, and temporarily store the video frame VF in an internal buffer area.

After the obtained video frame VF is decoded, based on the descriptions of the registration data RD, the images are deformed and rearranged according to relative positions, and are further mixed and corrected to generate a stitched video frame SVF.

The stitched video frame SVF is stored in a memory block of the rendering unit 550 and the rendering unit 550 further displays the stitched video frame SVF on a display device. The control unit 560 provides a user interface for the user to perform control operation on the displayed stitched video frame SVF, and sends the correspondingly generated viewing control message VCM to the video streaming gateway 300'. In some embodiments, the control unit 560 can obtain the registration data RD and, based on the contents of the registration data RD, can gain the information of a list or a expectable display area of the video streaming sources 100 currently can be received by the video streaming gateway 300' but has not yet been stitched to the stitched video frame SVF. In some other embodiments, the control unit 560 can prompt viewing operations on the user interface. Examples of the viewing operations include upward/downward movement, leftward/rightward movement, forward/backward movement and zooming.

Viewing operations, such as upward/downward movement, leftward/rightward movement, forward/backward movement and zooming, will be converted to a viewing control message VCM and sent to the video streaming gateway 300' by the control unit 560. In response to the viewing control messages VCM, the video streaming gateway 300' will provide descriptions of other adjacent video streaming sources 100 using the registration data RD.

In some embodiments, the descriptions may include an identification code of the video streaming sources 100. The control unit 560 can further request the video streaming gateway 300' to prepare and provide the connection authority and streaming resource of the requested video streaming sources 100 through other viewing control messages VCM.

In some other embodiments, if the video streaming sources 100 are already in a streaming state ready for streaming, the descriptions provided by the viewing control message VCM can be the URL of streaming connection (such as the URL of RTSP). In some other embodiments, the descriptions can further include the notification of the bandwidth required for the streaming connection of some video streaming sources 100, and the video streaming viewer 500' can use the bandwidth as an index for evaluating reception performance.

The descriptions of adjacent video streaming sources 100 disclosed above will be sent to the video streaming source selecting unit 540. Besides, the video streaming source selecting unit 540, based on the computation load of the video stitching unit 530, the display size restriction of the rendering unit 550 and the state of the reception bandwidth of the video streaming receiving unit 510, will evaluate whether the video streaming receiving unit 510 is able or necessary to receive some new video streaming sources 100.

After a capability evaluation is done, the video streaming source selecting unit 540 may select to receive the streaming connection of some new video streaming sources 100 or stop the streaming reception of some existing video streaming sources 100. The video streaming source selecting unit 540 will notify the video streaming receiving unit 510 of above change so that the video streaming receiving unit 510 can prepare new streaming connection or stop existing connection. In some embodiments, before notifying the video streaming receiving unit 510 to perform connection, the video streaming source selecting unit 540 needs to request the network connection resource of a particular video streaming source 100 through the control unit 560 and obtain the connection the URL in advance.

Figure 8A:
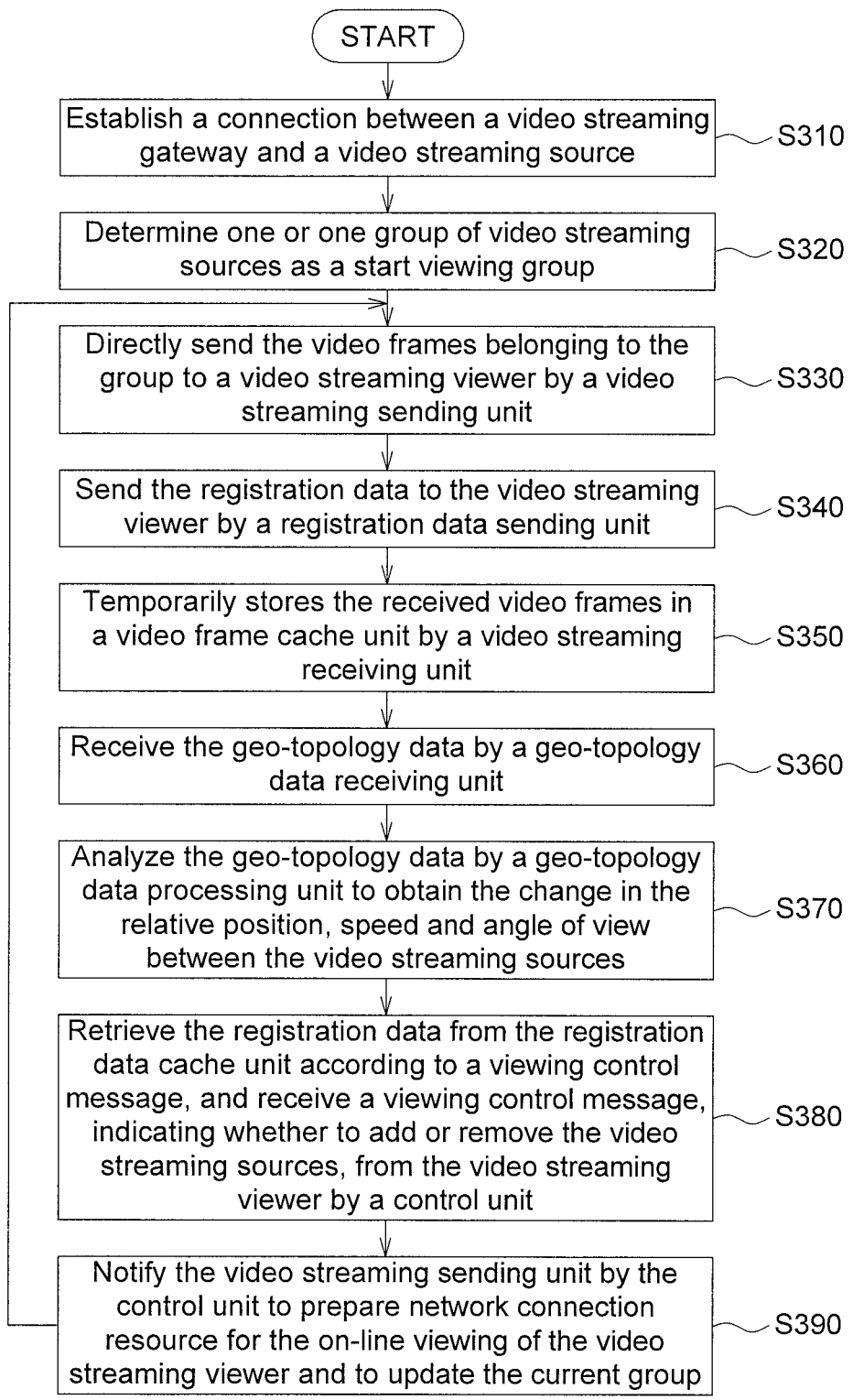
FIG. 8A and FIG. 8B are flowcharts illustrating operational processes of a video streaming gateway according to another embodiment.
Figure 8B:
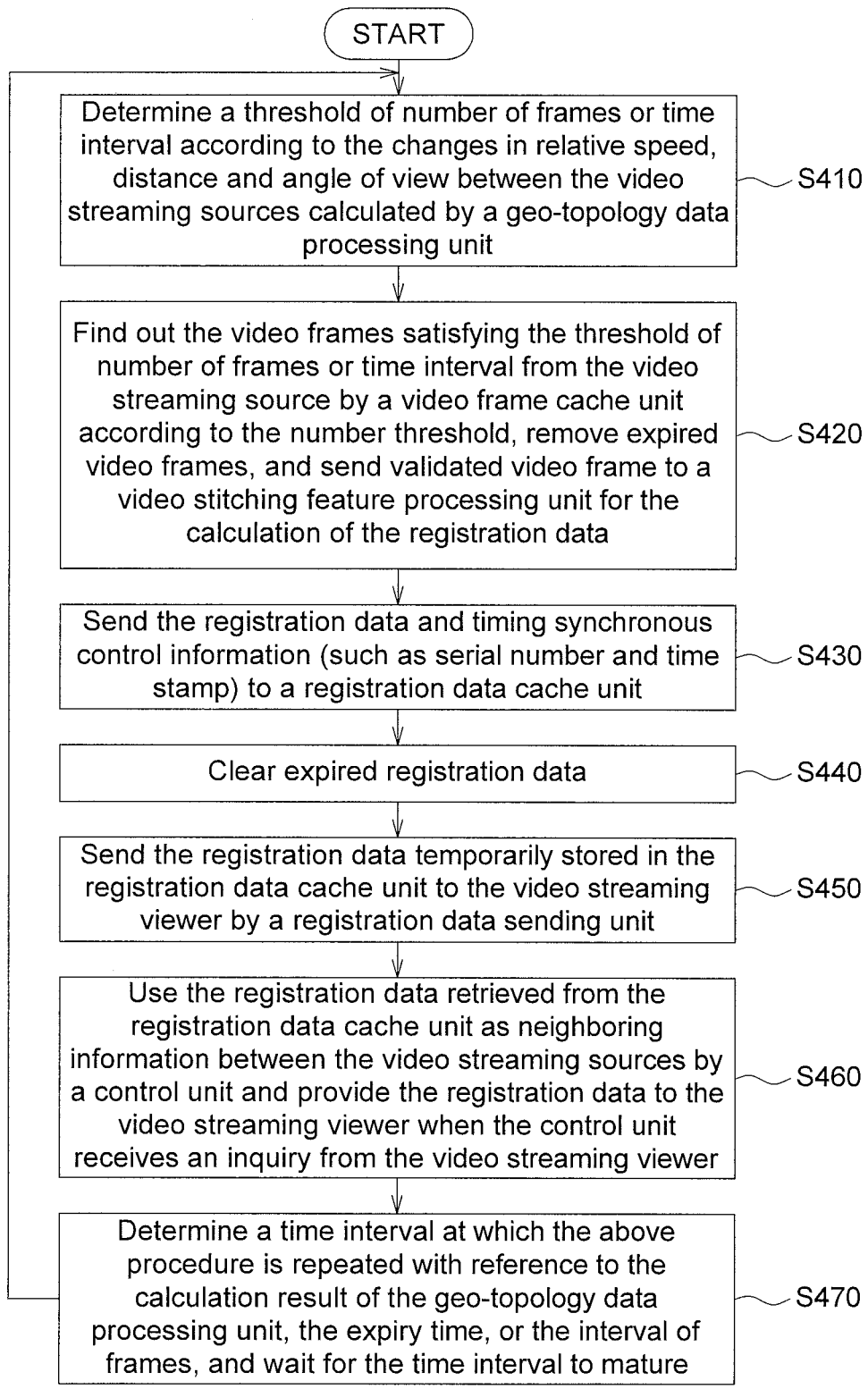

FIG. 8A and FIG. 8B illustrate operational processes of a video streaming gateway 300' according to another embodiment. As indicated in FIG. 8A, after the video streaming gateway 300' starts its operation, the following steps S310 to S390 are performed.

In step S310, a connection is established between a video streaming gateway 300' and a video streaming source 100, and packets are received continuously.

In step S320, when a video streaming viewer 500' starts to view the connection, one or one group of video streaming sources 100 is determined as a start viewing group.

In step S330, of the video frames VF received by the video streaming receiving unit 310 from each video streaming source 100, the video frames VF belonging to the group are directly sent to the video streaming viewer 500' by a video streaming sending unit 350.

In step S340, whether the registration data cache unit 340 contains any useful unexpired registration data RD is checked: if yes, the registration data RD is sent to the video streaming viewer 500' by a registration data sending unit 360.

In step S350, the video frames VF received by a video streaming receiving unit 310 are temporarily stored in a video frame cache unit 380.

In step S360, the geo-topology data GD are received from each video streaming source 100 by the geo-topology data receiving unit 320.

In step S370, the geo-topology data GD sent from each video streaming source 100 are analyzed by a geo-topology data processing unit 370 to obtain the change in the relative position, speed and angle of view between the video streaming sources 100.

In step S380, useful unexpired registration data RD are retrieved from the registration data cache unit 340 by a control unit 390 according to a viewing control message VCM, and are further provided to the video streaming viewer 500' to inquire neighboring information between the video streaming sources 100; and a viewing control message VCM indicating whether to add or remove the video streaming sources 100 is received from the video streaming viewer 500' by the control unit 390. The control unit 390 can also temporarily control the time limit of the registration data RD of the registration data cache unit 340 according to some commands.

In step S390, if there exists any viewing control messages VCM for increasing or removing the video streaming sources 100, the video streaming sending unit 350 is notified by the control unit 390 to prepare network connection resource for the on-line viewing of the video streaming viewer 500' and to update the current group.

Then, subsequent video frames VF are received continuously, and above steps S330 to S390 are repeated.

As indicated in FIG. 8B, after the video streaming gateway 300' starts to operate, following steps S410 to S470 are repeated every one time interval with the control of a timer.

In step S410, a threshold of number of frames or time interval is determined according to the changes in relative speed, distance and angle of view between the video streaming sources 100 calculated by a geo-topology data processing unit 370.

In step S420, the video frames VF satisfying the threshold of number of frames or time interval are found out from the video streaming source 100 by a video frame cache unit 380 according to the determined threshold, expired video frames VF are removed, and validated video frames VF are sent to a video stitching feature processing unit 330 for the calculation of the registration data RD.

In step S430, the registration data RD and timing synchronous control information (such as serial number and time stamp) are sent to a registration data cache unit 340 and temporarily stored therein.

In step S440, the expired registration data RD temporarily stored in the registration data cache unit 340 are cleared.

In step S450, the registration data RD temporarily stored in the registration data cache unit 340 are sent to the video streaming viewer 500' by a registration data sending unit 360.

In step S460, the registration data RD retrieved from the registration data cache unit 340 by a control unit 390 are used as neighboring information between the video streaming sources 100 and are provided to the video streaming viewer 500' when the control unit 390 receives an inquiry from the video streaming viewer 500'.

In step S470, a time interval at which the above procedure is repeated is determined with reference to the calculation result of the geo-topology data processing unit 370, the expiry time, or the interval of frames, and step S410 is performed when the time interval matures.

Figure 8C:
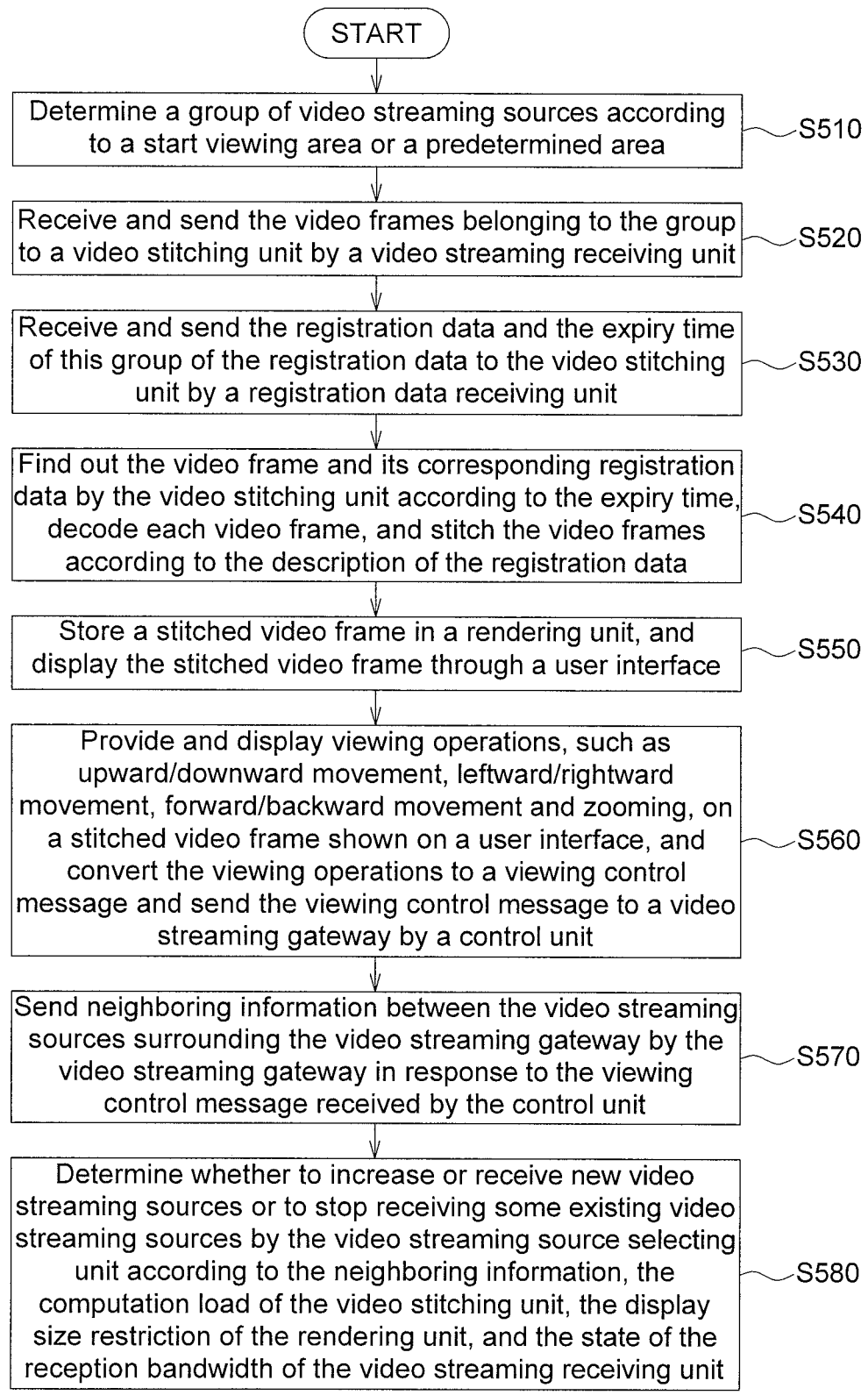
FIG. 8C is a flowchart illustrating operational processes of a video streaming viewer according to another embodiment.

FIG. 8C illustrates operational processes of a video streaming viewer 500' according to another embodiment. After the connection between the video streaming viewer 500' and the video streaming gateway 300' is established, steps S510 to S580 are performed.

In step S510, a group of video streaming sources 100 is determined according to a start viewing area or a predetermined area.

In step S520, the video frames VF belonging to the group are received and sent to a video stitching unit 530 by a video streaming receiving unit 510.

In step S530, the registration data RD and the expiry time of this group of the registration data RD are received and set to the video stitching unit 530 by a registration data receiving unit 520.

In step S540, each video frame VF and its usable registration data RD are found out by the video stitching unit 530 according to the expiry time, each video frame VF is decoded, and the video frames are stitched according to the description of the registration data RD. In some implementations, the present step may also include an estimation of brightness error and its correction. If no usable and useful combination of the registration data RD and the video frame VF can be found, then an individual video frame VF of a particular video streaming source 100, rather than a stitched video frame, will be displayed independently or the update of stitched video frames will be paused.

In step S550, a stitched video frame SVF is stored in the rendering unit 550, and displayed through a user interface.

In step S560, viewing operations, such as upward/downward movement, leftward/rightward movement, forward/backward movement and zooming, are provided by a control unit 560 and displayed on the stitched video frame SVF shown on a user interface, and the viewing operations are converted to viewing control messages VCM and sent to the video streaming gateway 300' by the control unit 560.

In step S570, neighboring information between the video streaming sources 100 surrounding the video streaming gateway 300' are sent by the video streaming gateway 300' in response to the viewing control message VCM received by the control unit 560.

In step S580, whether to increase or receive new video streaming sources 100 or to stop receiving some existing video streaming sources 100 is determined by the video streaming source selecting unit 540 according to the neighboring information, the computation load of the video stitching unit 530, the display size restriction of the rendering unit 550, and the state of the reception bandwidth of the video streaming receiving unit 510.

According to the above embodiments of the present disclosure, during the process of stitching the video frame VF, the registration data RD corresponding to previous time points is used, so that the delay caused by the generation of the registration data RD can be saved. The stitching and transmission of video streaming is only delayed by the process of stitching video frame VF, so the delay can be greatly reduced. If the video streaming viewer 500 only needs to display a partial area of the frame, only the needed part of the video frame VF needs to be sent to the video streaming viewer 500. Thus, competition in bandwidth can be effectively reduced. Moreover, during the process of stitching the video frame VF, by controlling the time difference between the time point of the video frame VF and the time point of the registration data RD to be within an error time, the frame quality will be above a certain level.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A video streaming stitching and transmitting method, comprising:
providing a plurality of video frames and a plurality of geo-topology data;
generating a registration data corresponding to a first time point according to part of the video frames and part of the geo-topology data corresponding to the first time point, and temporarily storing the registration data, wherein the registration data includes a description of relative position and overlapping area between the video frames; and
stitching part of the video frames corresponding to one or more second time point as a stitched video frame according to the registration data corresponding to the first time point, wherein the registration data is used repetitively for stitching part of the video frames before the next registration data is generated and the one or more second time point is different from the first time point.

2. The video streaming stitching and transmitting method according to claim 1, wherein the one or more second time point is later than the first time point.

3. The video streaming stitching and transmitting method according to claim 1, wherein the step of generating the registration data and the step of stitching the video frames are performed by different devices.

4. The video streaming stitching and transmitting method according to claim 1, wherein the video frames are transmitted to a video streaming gateway and then are transferred to a video streaming viewer.

5. The video streaming stitching and transmitting method according to claim 1, further comprising:
stitching part of the video frames corresponding to a third time point according to the registration data corresponding to the first time point, wherein the third time point is different from the first time point and the one or more second time point.

6. The video streaming stitching and transmitting method according to claim 1, wherein only part of the video frames are sent to a video streaming viewer, and whole of the registration data is sent to the video streaming viewer.

7. The video streaming stitching and transmitting method according to claim 1, wherein an accuracy of the stitched video frames corresponds to an error time, a time difference between the one or more second time point and the first time point is smaller than the error time.

8. The video streaming stitching and transmitting method according to claim 7, wherein the video frames are provided by a plurality of video streaming sources, the accuracy of the stitched video frames is predicted according to an overlapping degree of the video frames, a geographical location of the video streaming sources, a motion state of the video streaming sources, or a changing degree of the video frames.

9. A video streaming gateway, comprising:
a network interface used for receiving a plurality of video frames; and
receiving a plurality of geo-topology data;
a processing circuit used for generating a registration data corresponding to a first time point according to part of the video frames and part of the geo-topology data corresponding to the first time point, wherein the registration data includes a description of relative position and overlapping area between the video frames;
a storage used for temporarily storing the registration data;
wherein the network interface is further used for sending the registration data and
sending the video frames to a video streaming viewer for the video streaming viewer to stitch part of the video frames corresponding to one or more second time point as a stitched video frame according to the registration data corresponding to the first time point, wherein the registration data is used repetitively for stitching part of the video frames before the next registration data is generated and the one or more second time point is different from the first time point.

10. The video streaming gateway according to claim 9, wherein the one or more second time point is later than the first time point.

11. The video streaming gateway according to claim 9, wherein after the video frames are transmitted to the network interface, the network interface transfers the video frames to the video streaming viewer.

12. The video streaming gateway according to claim 9, wherein the network interface only sends part of the video frames to the video streaming viewer, and sends whole of the registration data to the video streaming viewer.

13. The video streaming gateway according to claim 9, wherein an accuracy of the stitched video frame corresponds to an error time, and a time difference between the one or more second time point and the first time point is smaller than the error time.

14. The video streaming gateway according to claim 13, wherein the video frames are provided by a plurality of video streaming sources, an accuracy of the stitched video frame is predicted according to an overlapping degree between the video frames, a geographical location of the video streaming sources, a motion state of the video streaming sources or a changing degree of the video frames.

15. The video streaming gateway according to claim 9, wherein the video frames are provided by a plurality of video streaming sources, and the processing circuit is further used for retrieving the registration data from the storage for the video streaming viewer to inquire a neighboring information between the video streaming sources.

16. The video streaming gateway according to claim 15, wherein the processing circuit is further used for receiving a viewing control message which indicates to increase or remove the video streaming sources, wherein the viewing control message is from the video streaming viewer.

17. The video streaming gateway according to claim 9, wherein the storage is further used for searching the video frames according to a frame number threshold or a time threshold.

18. A video streaming viewer, comprising:

a network interface used for receiving a plurality of video frames and receiving a registration data corresponding to a first time point, wherein the registration data includes a description of relative position and overlapping area between the video frames; and a processing circuit used for stitching part of the video frames corresponding to one or more second time point as a stitched video frame according to the registration data corresponding to the first time point, wherein the stitched video frame is displayed through a user interface, the registration data is used repetitively for stitching part of the video frames before the next registration data is generated and the one or more second time point is different from the first time point.

19. The video streaming viewer according to claim 18, wherein the one or more second time point is later than the first time point.

20. The video streaming viewer according to claim 18, wherein the processing circuit further stitches part of the video frames corresponding to a third time point according to the registration data corresponding to the first time point, and the third time point is different from the first time point and the one or more second time point.

21. The video streaming viewer according to claim 18, wherein the network interface only receives part of the video frames, and receives whole of the registration data.

22. The video streaming viewer according to claim 18, wherein the network interface receives the registration data and an expiry time of the registration data.

23. The video streaming viewer according to claim 22, wherein the processing circuit obtains the video frames and the registration data according to the expiry time, encodes each of the video frames, stitches the video frames according to the registration data.

24. The video streaming viewer according to claim 18, wherein the processing circuit is further used for receiving an operation shown on the stitched video frame displayed on the user interface and converts the operation to a viewing control message, which is sent to a video streaming gateway.

* * * * *